April 18, 1950 R. TAYLOR ET AL 2,504,755
TWO-MOTION TYPE AUTOMATIC TELEPHONE SWITCH
ARRANGED FOR TESTING TWO OR MORE LINES
OF A SELECTED GROUP SIMULTANEOUSLY
Filed Feb. 14, 1946 2 Sheets-Sheet 1

INVENTOR.
REGINALD TAYLOR
GEORGE THOMAS BAKER
BY
Chas. W. Candy
ATTORNEY

April 18, 1950 R. TAYLOR ET AL 2,504,755

TWO-MOTION TYPE AUTOMATIC TELEPHONE SWITCH ARRANGED FOR TESTING TWO OR MORE LINES OF A SELECTED GROUP SIMULTANEOUSLY

Filed Feb. 14, 1946 2 Sheets-Sheet 2

*INVENTOR.*
REGINALD TAYLOR
GEORGE THOMAS BAKER
*BY*
[signature]
ATTORNEY

Patented Apr. 18, 1950 2,504,755

UNITED STATES PATENT OFFICE 2,504,755

TWO-MOTION TYPE AUTOMATIC TELEPHONE SWITCH ARRANGED FOR TESTING TWO OR MORE LINES OF A SELECTED GROUP SIMULTANEOUSLY

Reginald Taylor and George Thomas Baker, Liverpool, England, assignors to Automatic Electric Laboratories Inc., Chicago, Ill., a corporation of Delaware Application February 14, 1946, Serial No. 647,598
In Great Britain March 7, 1945

7 Claims. (Cl. 179—18)

The present invention relates to automatic switches for use in telephone or like systems and is more particularly concerned with switches arranged to perform a hunting operation to test for a line marked in a particular manner. The invention moreover is particularly applicable to group selector switches of the well known vertical and rotary type, especially those equipped with two sets of wipers so that testing takes place over two lines simultaneously.

A switch of this general type is disclosed in United States Patent No. 2,137,423, granted November 22, 1938, to Reginald Taylor and George Thomas Baker, and one of the special features is that when a free line is encountered and seized by a switch which is hunting over a group, the marking of the line as busy is effected very rapidly in order to reduce the chances of two switches seizing the same line. For this purpose use is made of a relay which is maintained operated by busy potential encountered by the test wiper during its movement and which releases to apply busy potential when an idle outlet is reached. With the need for increase in the speed of hunting switches, it is sometimes found that the wipers tend to overshoot the contacts momentarily and if this occurs, the maintaining circuit for the relay is opened and it may therefore release and cause the switch to seize a busy line. The chief object of the invention is to provide improved arrangements whereby if such overshooting action should occur it will not prejudice the operation of the switch and hence the danger of double connections is eliminated.

According to one feature of the invention, in an automatic switch arranged to perform a hunting operation under the control of a relay which is maintained energised as long as marked lines are encountered and when energised closes a point in a self-interrupted circuit for the driving magnet, the relay is adapted to be held operated over one winding in series with the driving magnet until the magnet operates its interrupter contacts and thereafter to be maintained over a second winding by potential picked up by a test wiper if a marked line is then encountered.

According to another feature of the invention, in an automatic switch of the vertical and rotary type arranged to be set by impulses in the vertical direction and thereafter to perform a hunting operation in the rotary direction under the control of a relay which is maintained energised as long as marked lines are encountered and when energised closes a point in a self-interrupted circuit for the driving magnet, a further relay which is energised as soon as the switch is taken into use is arranged to be intermittently short-circuited in a circuit including operated contacts of the hunting control relay while impulses are being received and on de-energisation by prolonged short-circuiting when the impulses terminate serves to initiate the hunting operation.

Figure 1:
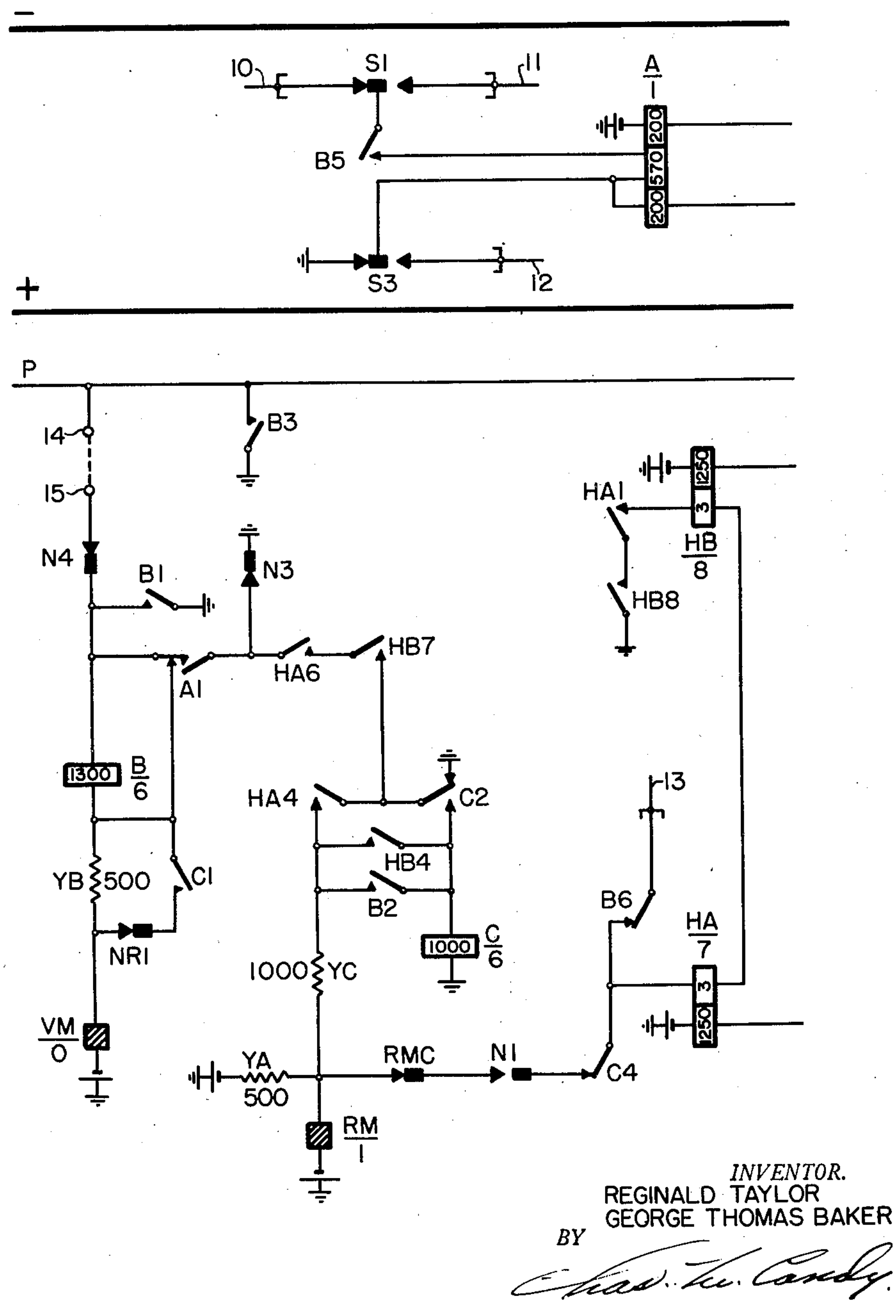
Figure 2:
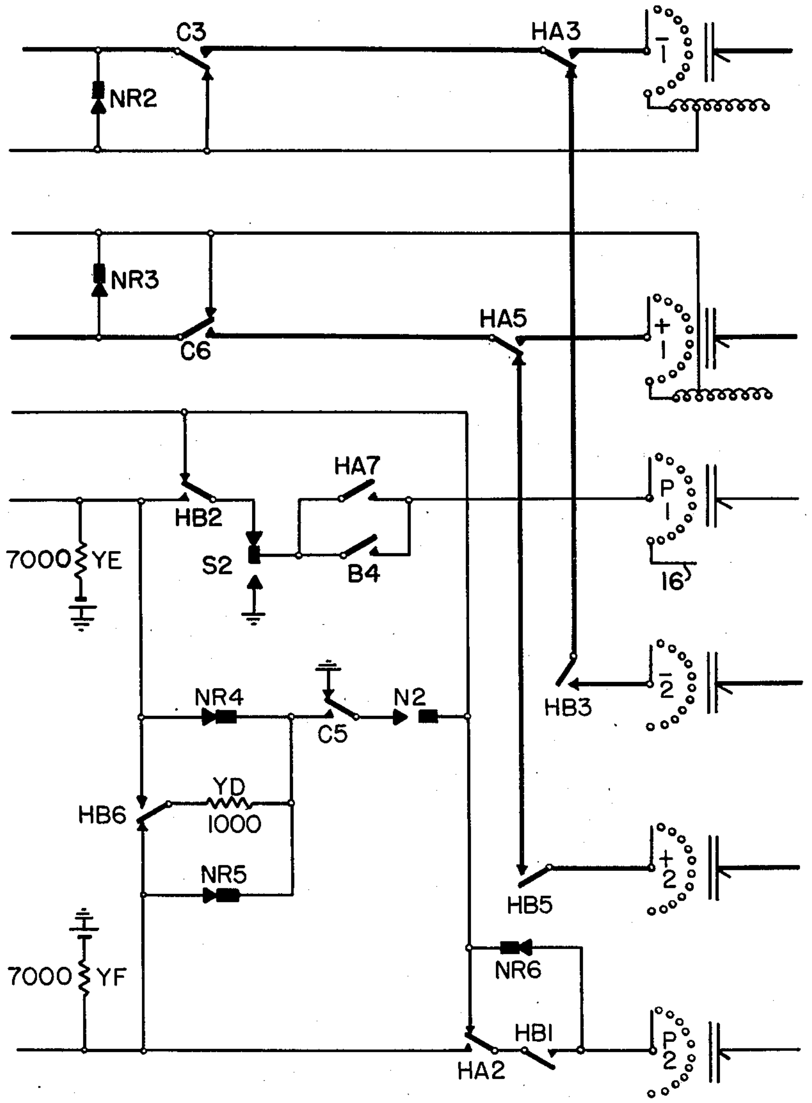

The invention will be better understood from the following description of a preferred method of carrying it into effect which should be taken in conjunction with the accompanying drawings comprising Figures 1 and 2. These drawings are diagrammatic in form and when arranged side by side show the circuit of a 200-point group selector of the vertical and rotary type arranged to have so-called rectangular release, that is to say the wipers are restored to normal by continuing their rotary movement until they are clear of the contacts after which they fall and rotate back to normal beneath the bank.

Considering now the operation of the switch in detail, when it is taken into use, relay A is operated over the loop by way of its outer windings and thereupon completes a circuit for relay B from earth over contacts N3 in series with resistor YB and vertical magnet VM. Magnet VM is inoperative in this circuit but relay B operates and at contacts B1 completes a locking circuit for itself, at contacts B2 energises relay C in series with rotary magnet RM which is inoperative in these circumstances, at contacts B3 earths the incoming P conductor to hold the preceding switches if necessary, at contacts B4 prepares a circuit for relay HB, at contacts B5 connects up the middle winding of relay A and at contacts B6 opens a point in the release circuit which extends to earth by way of suitable delayed alarm equipment over common lead 13.

It may be mentioned that the switch is equally suitable for use as a first group selector, an incoming selector or a subsequent group selector. If it is being used as a first selector, the middle winding of relay A is now connected to dial tone by way of cam contacts S1 and common lead 10 and the relay in known manner serves as a tone transformer so that dial tone is audible to the calling party. If the switch is not being used as a first selector, the connection to lead 10 is not made. Moreover, if the switch is being used as a first selector terminals 14 and 15 may be strapped so that an immediate guard on the P conductor is provided by contacts A1 over off-normal contacts N4 in the manner described in United States Patent No. 2,424,519 granted July 22, 1947, to Reginald Taylor and George Thomas Baker.

Relay C upon operating, at contacts C1 short-circuits resistor YB, at contacts C2 prepares a control circuit for itself, at contacts C3 and C6 prepares for the disconnection of relay A, at contacts C4 opens a point in the rotary magnet circuit and at contacts C5 prepares circuits for relays HA and HB.

No further changes take place until a digit is received, whereupon relay A responds accordingly and on each de-energisation completes a circuit for magnet VM which therefore operates to raise the wipers a corresponding number of steps. Relay B is short-circuited intermittently but not sufficiently long to cause its release. As soon as the switch moves off-normal, the vertical off-normal contacts are operated and at contacts N1 a point is closed in the rotary magnet circuit, at contacts N2 circuits are completed for relays HA and HB over contacts NR5 and NR4 respectively, at contacts N3 the initial circuit of relay B is opened and at contacts N4 the connection of relay B to the P conductor is interrupted to prevent this relay being held up subsequently. Relay HA at contacts HA1 closes another point in the rotary magnet circuit, at contacts HA2 prepares a locking circuit for itself to the test wiper P2, at contacts HA3 and HA5 connects up the wipers −1 and +1, at contacts HA4 completes an alternative circuit for relay C, at contacts HA6 prepares a shunting circuit for relay C and at contacts HA7 prepares a holding circuit for relay HB to the test wiper P1. Relay HB performs somewhat similar functions and particularly at contacts HB1 connects relay HA to wiper P2, at contacts HB2 connects itself to wiper P1, at contacts HB3 and HB5 connects up wipers −2 and +2, at contacts HB4 completes an alternative circuit for relay C, at contacts HB6 changes over the subsequent operating circuits for itself and relay HA, at contacts HB7 closes another point in the shunting circuit for relay C, and at contact HB8 closes another point in the rotary magnet circuit.

In view of the circuit completed over contacts B1, A1, HA6, HB7 and C2, relay C is intermittently short-circuited during the train of impulses but remains energised. At the end of the train, however, relay A remains steadily operated and relay C therefore releases, thereupon at contacts C4 completing the rotary magnet circuit in series with the low resistance windings of relays HA and HB. The magnet therefore operates to advance the wipers into engagement with the first set of bank contacts and at the end of its stroke opens the interrupter contacts RMC whereupon it is de-energised. On the first rotary step the rotary off-normal contacts are operated, thereupon at contacts NR1 ensuring that resistor YB remains included in the vertical magnet circuit, at contacts NR2 and NR3 preparing for the disconnection of relay A and at contacts NR4 and NR5 opening the initial circuits of relays HB and HA. In view of the fact that the circuits over the low resistance windings of relays HA and HB have been opened and also that the initial circuits over the high resistance windings are no longer available, these relays are now dependent for their continued operation on earth picked up by wipers P1 and P2.

Four possibilities may now arise, viz. that wiper P1 will engage an idle line while wiper P2 will engage a busy line, that both wipers will engage idle lines, that wiper P2 will engage an idle line and wiper P1 a busy one, or that both wipers will engage busy lines.

Consider first the case in which wiper P1 encounters an idle line while wiper P2 encounters a busy line. Since wiper P1 does not pick up earth, no circuit is provided for maintaining relay HB and it therefore de-energises, thereupon at contacts HB8 opening a further point in the rotary magnet circuit and at contacts HB1 disconnecting relay HA from wiper P2 so that this relay also de-energises. Relays HA and HB are shunted respectively by resistors YF and YE the resistance value of which is so chosen as to give the required release lag to cover any momentary interruption of the maintaining circuits in the case of possible overshoot of the wipers. The release of relay HB applies an immediate guarding earth to wiper P1 over contacts S2 and B4 so as to seize the free outlet engaged by this wiper. Moreover, at contacts HB7 the short-circuit completed around relay C at contact C2 is removed and relay C therefore reoperates. Thereupon a new circuit is completed for relay HA over contacts B3, N2 and C5, resistor YD and contacts HB6. Relays C and HA then connect up the first set of talking wipers −1 and +1 and the incoming P conductor is connected through to wiper P1 over contacts HB2, S2 and HA7. Relay HA also completes a holding circuit over contacts HA4 and C2 for relay C. The operation of relay C disconnects relay A from the line, whereupon it releases and short-circuits relay B and transmits a pulse to the magnet VM which is however ineffective owing to the inclusion of resistor YB in the circuit. Relay B de-energises after its slow period and removes the local guarding earth from the P conductor at contacts B3, opens the initial circuit of relay C at contacts B2 and prepares the release circuit at contacts B6. Relay HA now remains energised from earth on the P conductor and relay C is maintained dependent upon relay HA.

If both outlets encountered are idle, neither relay HA nor relay HB can be held up over the associated test wiper and they both de-energise. The conditions are then the same as in the case just described and relay C is re-operated and brings up relay HA so that the first set of wipers receives preference. The re-operation of relay C brings down relay A and this is followed by the release of relay B.

In the third case in which wiper P1 encounters earth and wiper P2 does not, relay HA is de-energised and relay HB remains operated owing to the fact that contacts HA7 are shunted by contact B4. The release of relay HA, however, removes the short-circuit from relay C and this relay operates with the results previously described. It will be appreciated that an immediate guard is provided on wiper P2 over contacts HB1 and HA2 and that during the subsequent connection, relay HB is held up over contacts HB1, HA2, N2 and C5, resistor YD and contacts HB6. The second set of talking wipers −2 and +2 are accordingly connected up at contacts HB3 and HB5 over resting contacts HA3 and HA5 and relay C is maintained energised over contacts HB4.

In the fourth case in which both wipers encounter busy outlets, both relays HA and HB remain energised and consequently when the interrupter contacts RMC again close, the magnet RM is re-energised and advances the wipers a further step. In the position then reached all four possibilities are again operative. It may be pointed out that the speed of rotary stepping may be accurately controlled by the shunt provided by resistor YA and the leak comprised by resistor YC.

If the wipers are advanced over the whole group without either wiper encountering a free line, the eleventh step position is reached in which the so-called cam springs S are operated. Thereupon at contacts S2 an overflow meter connected to lead 16 is operated over the 11th step position of wiper P1 and the holding circuit for relay HB is opened. It accordingly releases and opens the circuit of relay HA which would be released in any event since the 11th step contact in the bank of wiper P2 is unwired. Thereupon relay C is re-operated and again brings up relay HA whereupon conditions similar to switching on the first set of wipers are established except that the negative and positive wipers are now connected back to the outer windings of relay A over the eleventh step positions of wipers —1 and +1. At contacts S1 busy tone earth over common lead 11 is connected to the middle winding of relay A and at contacts S3 earth and battery applied alternately to common lead 12 are connected to the middle and lower windings of relay A. This relay again acts as a tone transformer for repeating the busy tone and during the flash or battery periods the relay is maintained over its middle winding and leads 11 and 12.

When the calling party hangs up in response to the receipt of busy tone, relay A is released during one of the earth periods on lead 12 and thereupon short-circuits relay B. This relay on releasing removes earth from the P conductor at contacts B3 whereupon relay HA is released and in turn opens the circuit of relay C. When relay C also is released the circuit of the magnet RM is again completed at contacts C4, this time to the release alarm earth over common lead 13 and contacts B6. The wipers therefore take a further step, fall, and rotate back to normal beneath the banks, the vertical and rotary off-normal contacts then being restored. During the release time of relay C the P conductor is momentarily unguarded so as to permit the release of preceding switches. Earth is then replaced on this conductor at contacts C5 until the switch has restored to normal and contacts N2 open. It will be noted, however, that even if the switch should be seized during the unguard period, release cannot be interfered with since no circuit can be completed for relay B until full restoration has taken place.

The return of the switch wipers to normal after an ordinary successful connection takes place in generally similar manner when earth is removed from wiper P1 or wiper P2 as the case may be to permit the release of relay HA or relay HB. Thereupon relay C is released and the restoring circuit for the switch is completed.

If the switch is released without any impulses having been transmitted thereto, the conditions are slightly different. In this case relays A, B and C are all energised when the loop is opened and a single impulse is transmitted to the magnet VM which therefore raises the wipers to the first level and operates the off-normal contacts so that relays HA and HB are energised. On the subsequent release of relay B, however, the circuit for relays HA and HB is opened at contacts B3 and these relays therefore release and bring down relay C whereupon the wipers are restored to normal in the usual manner.

It will be appreciated that since relay C has only one winding and is energised as soon as the switch is taken into use, the circuit conditions governing its release are the same at whatever stage the calling party hangs up. This ensures a uniform release time for relay C and hence an unguard period of constant length, which simplifies the maintenance required for securing efficient operation of the system.

We claim:

1. In a telephone system, a switch having a test wiper, a test relay having two windings, a stepping magnet, interrupter springs operative by said magnet, a circuit including said springs, said magnet and one winding of said relay in series with said magnet, means for operating said relay over said second winding, means responsive to said operation of said relay for causing said circuit to operate said magnet thereby to step said wiper in a hunting operation, said last means also retaining said relay in said operated position over said one winding in series with said magnet until said magnet operates said springs, means for disabling said first means, a second circuit including test contacts, said wiper and said second winding for maintaining said relay in said operated position when said wiper encounters marked test contacts, an operation of said springs by said wiper disabling said one winding, said relay thereafter maintained in said operated position over said second winding in response to said wiper successively engaging marked test contacts.

2. In a telephone system as claimed in claim 1 together with a resistive element in shunt of said second winding, means for causing the release of said operated relay, said resistive element in shunt of said second winding providing a controlled release lag for said operated relay.

3. In a telephone system, a switch having a test wiper, a test relay, a stepping magnet, interrupter springs operative by said magnet, a circuit including said springs, said magnet and said relay in series with said magnet, a second circuit, means for operating said relay over said second circuit, means responsive to said operation of said relay for causing said first circuit to operate said magnet thereby to step said wiper in a hunting operation, said last means also retaining said relay in said operated position in series with said magnet until said magnet operates said springs, means for disabling said second circuit, a third circuit including test contacts, said wiper and said relay for maintaining said relay in said operated position when said wiper encounters marked test contacts, an operation of said springs by said magnet disabling said first circuit and disconnecting said relay from in series with said magnet, said relay thereafter maintained in said operated position over said third circuit in response to said wiper successively engaging marked test contacts.

4. In a telephone system as claimed in claim 3 together with means for disabling said third circuit to cause the release of said operated relay, and means for controlling the release time of said operated relay thereby to delay the releasing of said operated relay.

5. In a telephone system, a switch having a relay, a wiper and a stepping magnet, a normally incomplete self-interrupting circuit for said magnet, means responsive to a seizure of said switch for causing said relay to operate, means responsive to a series of impulses received after said seizure for intermittently completing a short circuit around said relay while said relay is maintained in said operated position, said last means maintaining said short circuit for a prolonged interval when said series of impulses ceases thereby to cause another operation of said relay, and means responsive to said last operation of said relay for completing said self-interrupting circuit thereby to cause said magnet to step said wiper.

6. In a telephone system, a switch having a plurality of test wipers, a plurality of test relays each having two windings, a stepping magnet, interrupter springs operative by said magnet, a circuit including said springs, said magnet and one winding of each said relay in series with each other and with said magnet, means for causing said circuit to operate said magnet thereby to step said wipers simultaneously in a hunting operation, said means also energizing said relays over said one windings in series with each other and with said magnet until said magnet operates said springs, a plurality of other circuits each including test contacts, one of said wipers and one of said second windings for maintaining one of said relays energized when said one wiper encounters marked test contacts, an operation of said springs by said magnet disabling said one windings, each said relay thereafter maintained energized over its second winding in response to said respective wiper successively engaging marked test contacts.

7. In a telephone system, a switch having a test relay, test contacts, a test wiper, a stepping magnet, a self-interrupting circuit including said relay in series with said magnet, a control relay, means for operating said control relay, means for operating said test relay, means for restoring said operated control relay, means responsive to said restoration of said control relay for causing said circuit to operate said magnet thereby to step said wiper in a hunting operation over said contacts, said last means also retaining said test relay in said operated position in series with said magnet, means for disabling said second means, means for restoring said test relay from said operated position responsive to said wiper encountering an unmarked test contact, means responsive to said restoration of said test relay for re-operating said control relay, and means for re-operating said test relay in response to said re-operation of said control relay.

REGINALD TAYLOR.
GEORGE THOMAS BAKER.

REFERENCES CITED

The following references are of record in the file of this patent:

UNITED STATES PATENTS

| Number | Name | Date |
|---|---|---|
| 1,623,230 | Bellamy | Apr. 5, 1927 |
| 1,696,254 | Pinell | Dec. 25, 1928 |
| 1,725,152 | Lomax | Aug. 20, 1929 |
| 1,868,296 | Stokely | July 19, 1932 |
| 2,137,423 | Taylor | Nov. 22, 1938 |